Oct. 31, 1939.   R. S. QUICK ET AL   2,178,123
HYDRAULIC SYSTEM
Filed Oct. 30, 1935   8 Sheets-Sheet 3
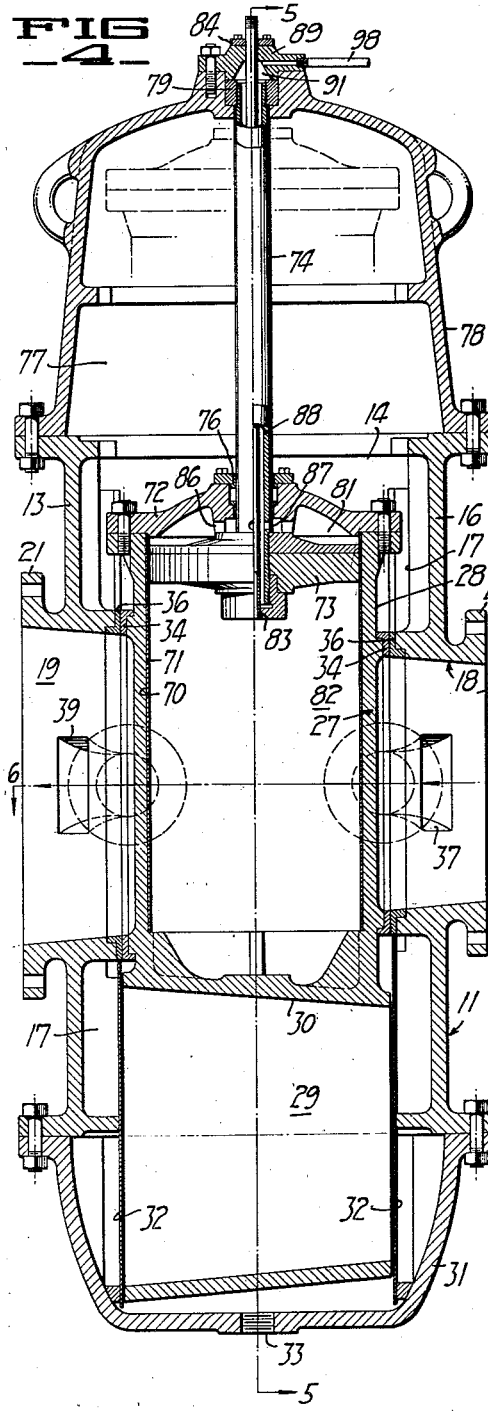
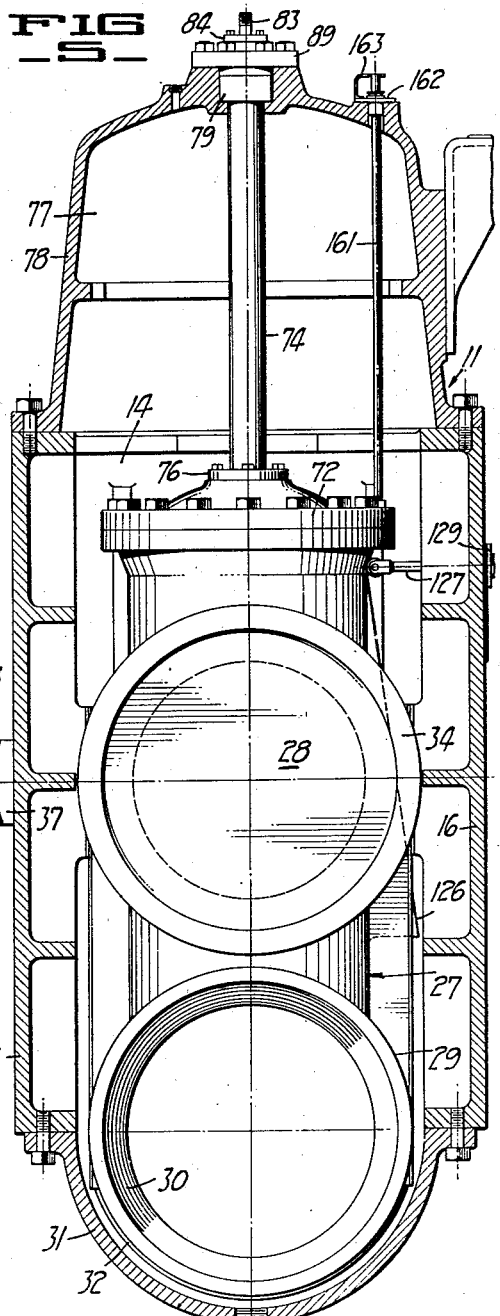
INVENTORS
Ray S. Quick
George A. Buehle
BY Marcus Lothrop
ATTORNEY.

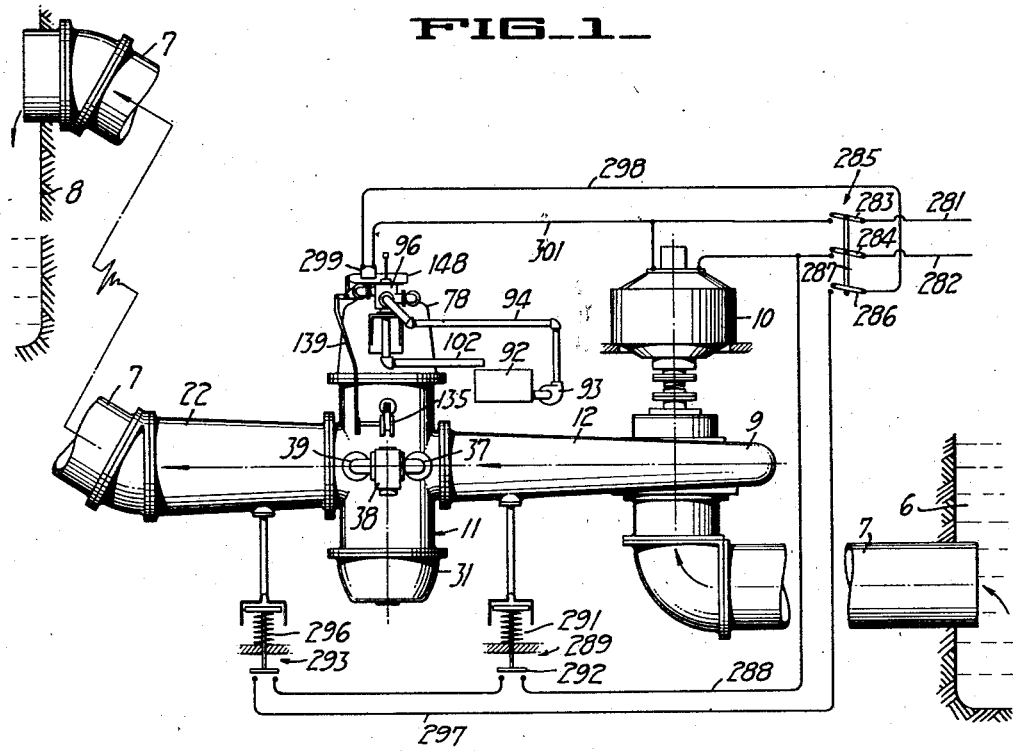

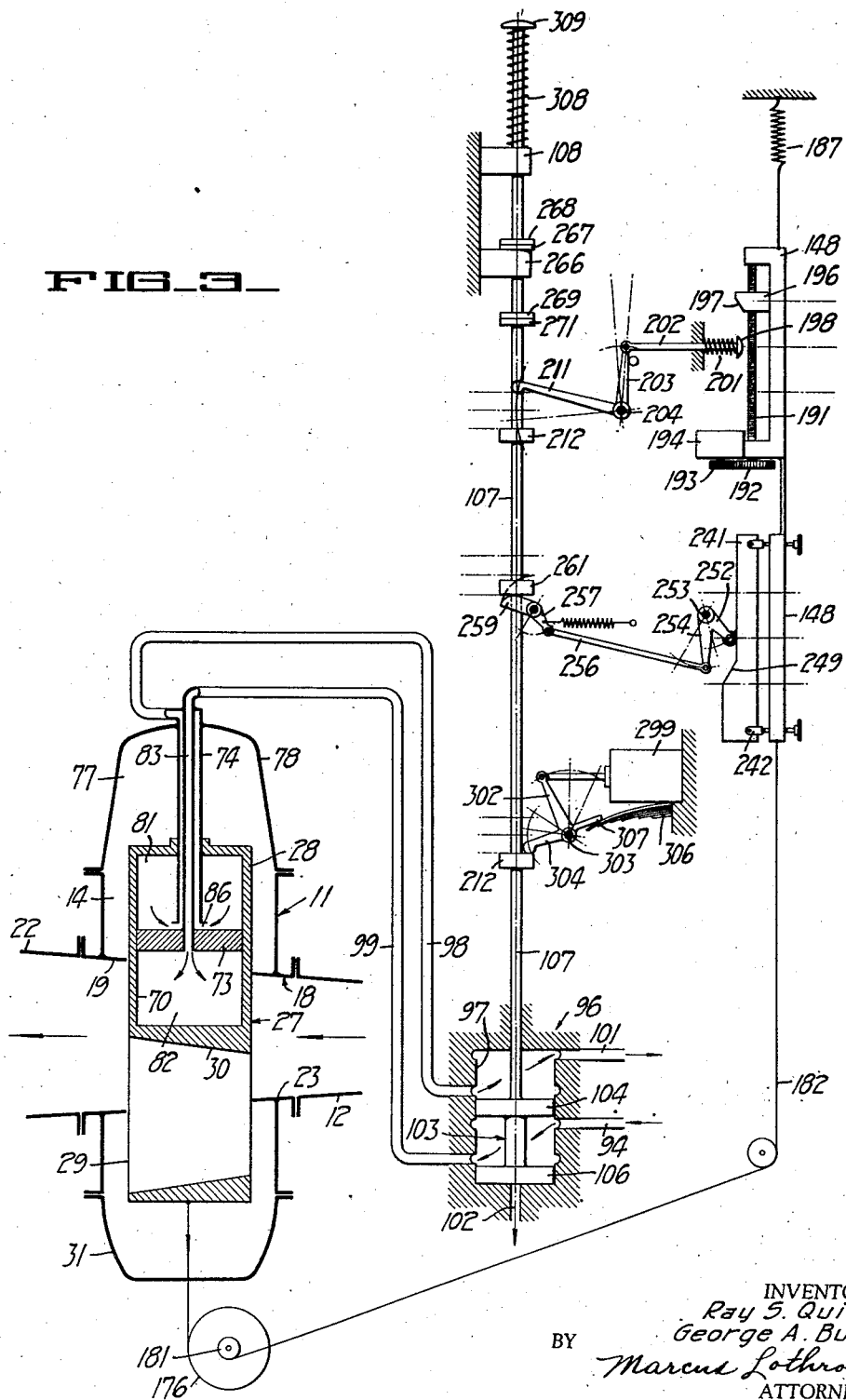
Oct. 31, 1939. R. S. QUICK ET AL 2,178,123
HYDRAULIC SYSTEM
Filed Oct. 30, 1935 8 Sheets-Sheet 2
FIG_3_
INVENTORS
Ray S. Quick
George A. Buehle
BY Marcus Lothrop
ATTORNEY.

Oct. 31, 1939.    R. S. QUICK ET AL    2,178,123
HYDRAULIC SYSTEM
Filed Oct. 30, 1935    8 Sheets-Sheet 4
FIG_6_
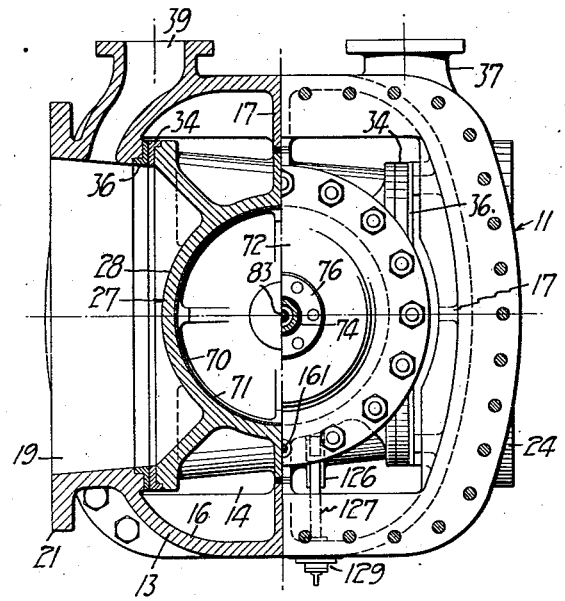
FIG_7_
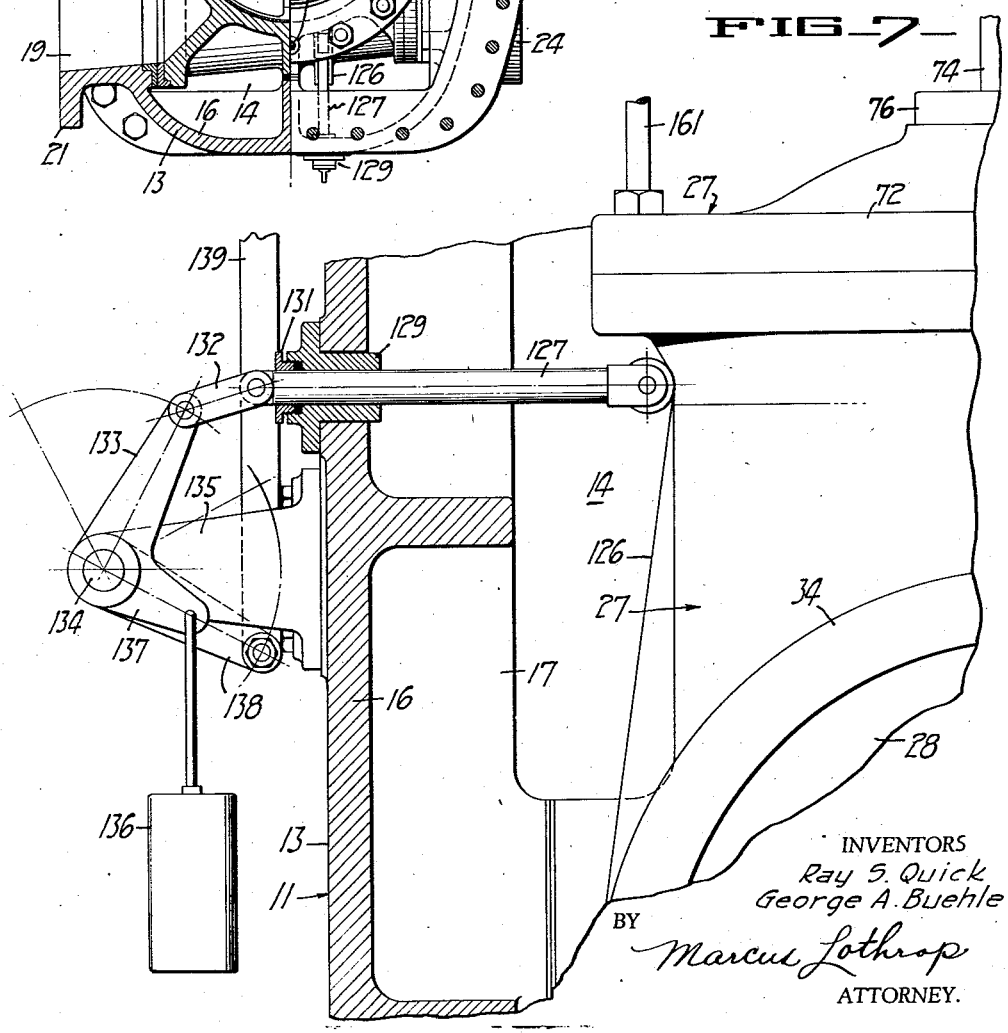
INVENTORS
Ray S. Quick
George A. Buehle
BY Marcus Lothrop
ATTORNEY.

Oct. 31, 1939.  R. S. QUICK ET AL  2,178,123
HYDRAULIC SYSTEM
Filed Oct. 30, 1935  8 Sheets-Sheet 5
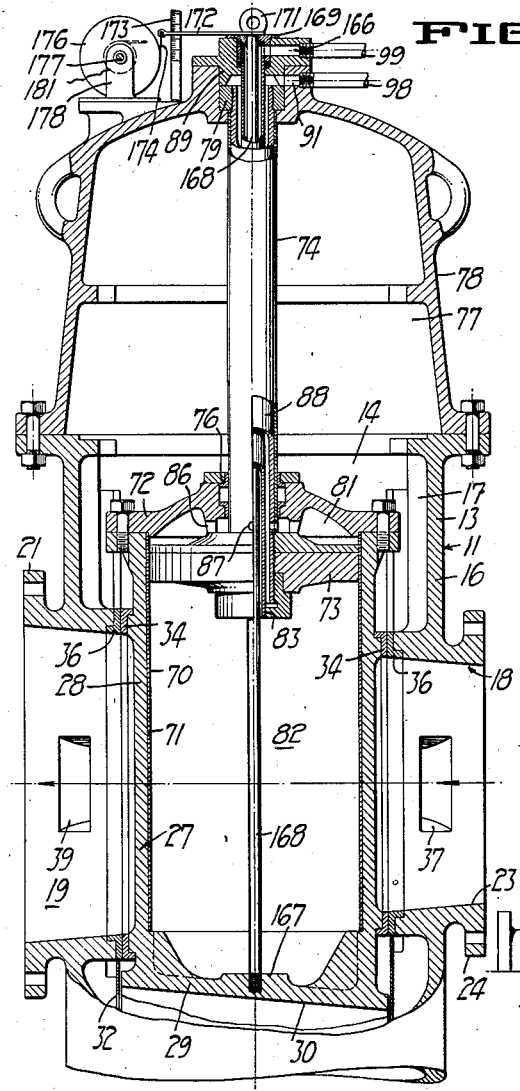
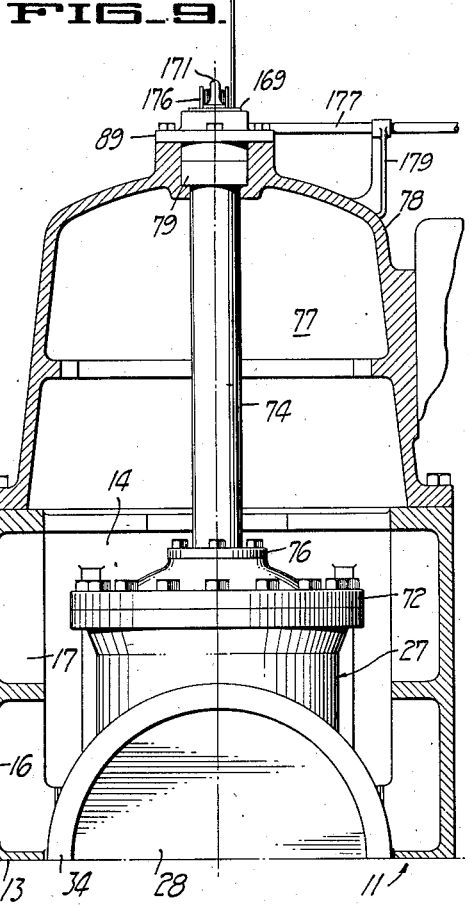
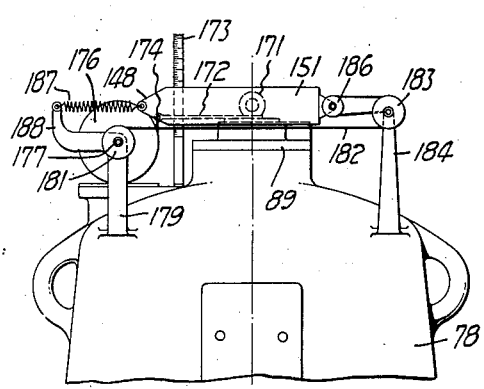
INVENTORS
Ray S. Quick
George A. Buehle
BY  Marcus Lothrop
ATTORNEY.

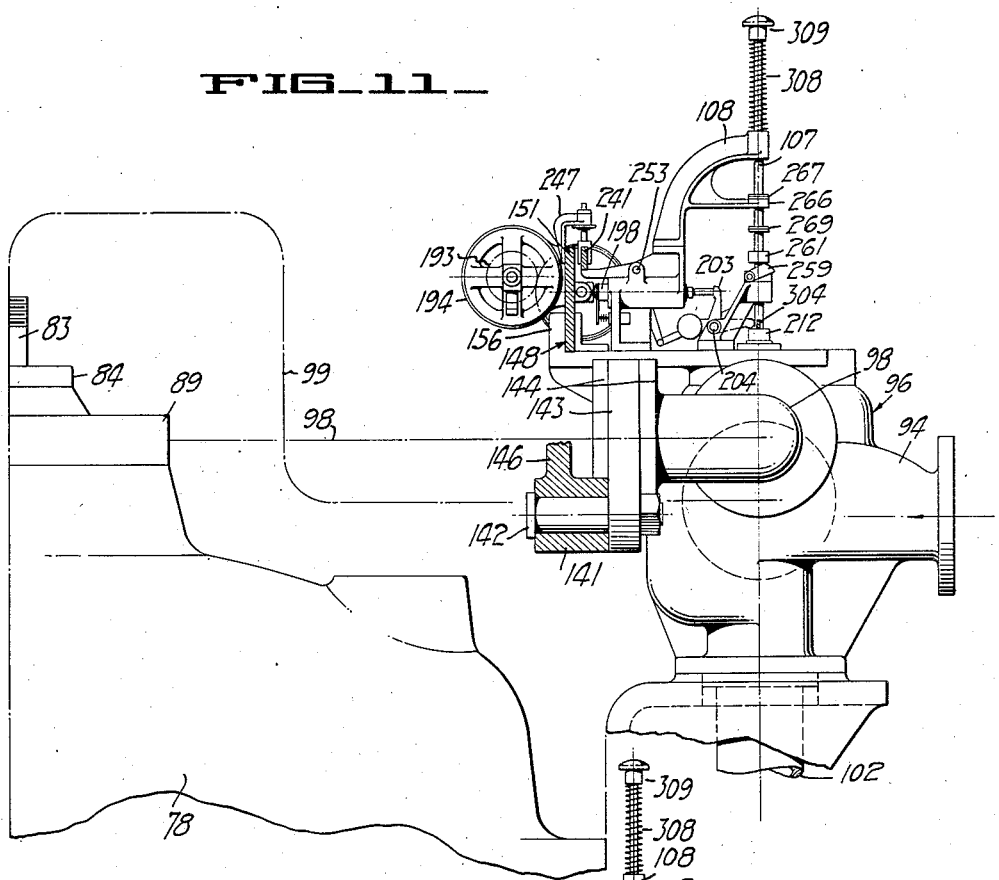
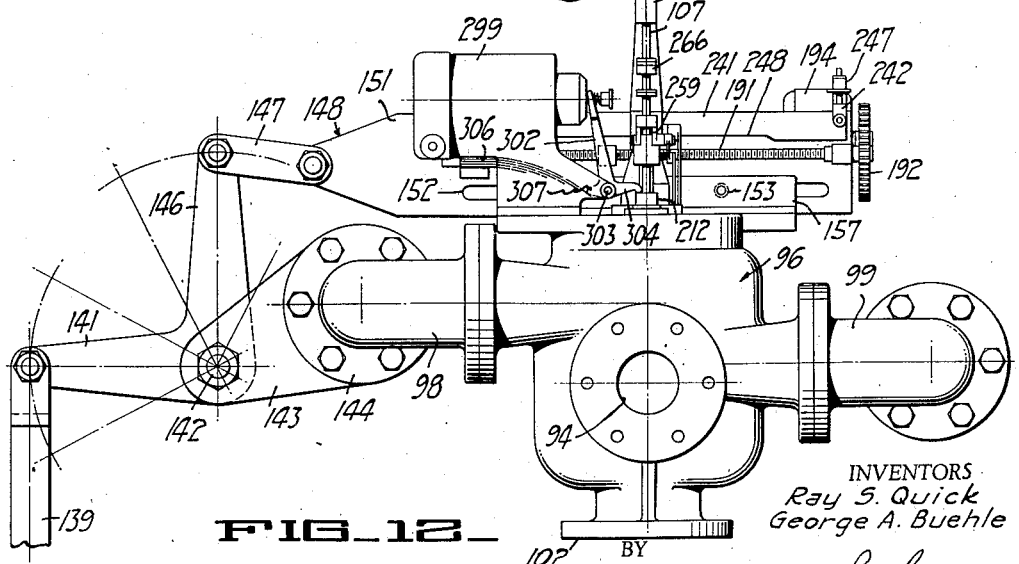

Oct. 31, 1939.  R. S. QUICK ET AL  2,178,123
HYDRAULIC SYSTEM
Filed Oct. 30, 1935   8 Sheets-Sheet 7
FIG_13_
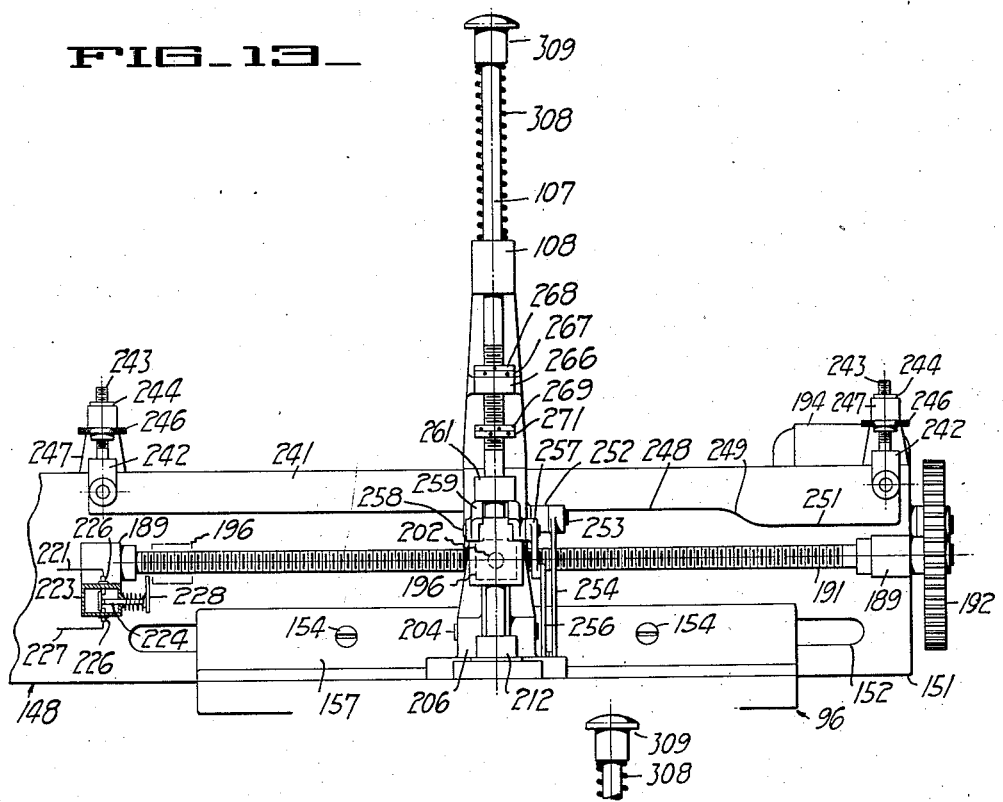
FIG_14_
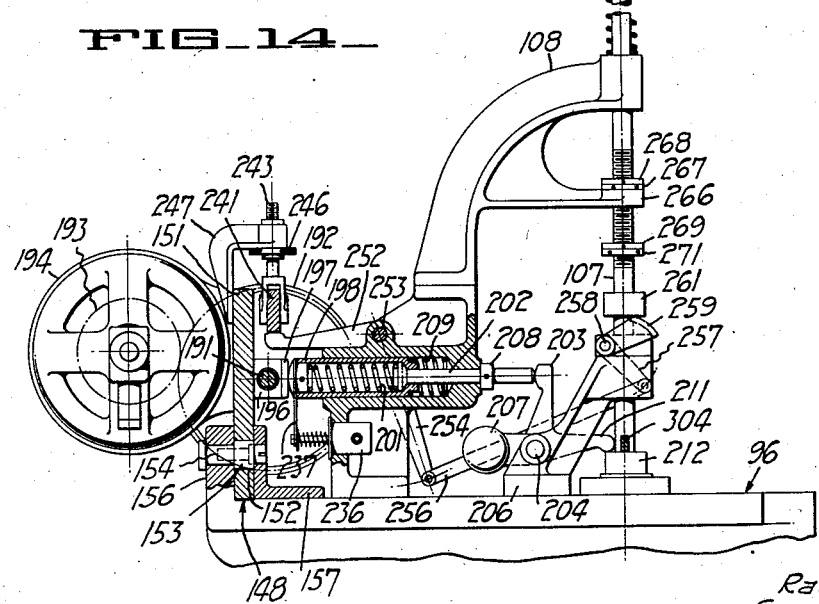
INVENTORS
Ray S. Quick
George A. Buehle
BY Marcus Lothrop
ATTORNEY.

Oct. 31, 1939.   R. S. QUICK ET AL   2,178,123
HYDRAULIC SYSTEM
Filed Oct. 30, 1935   8 Sheets-Sheet 8
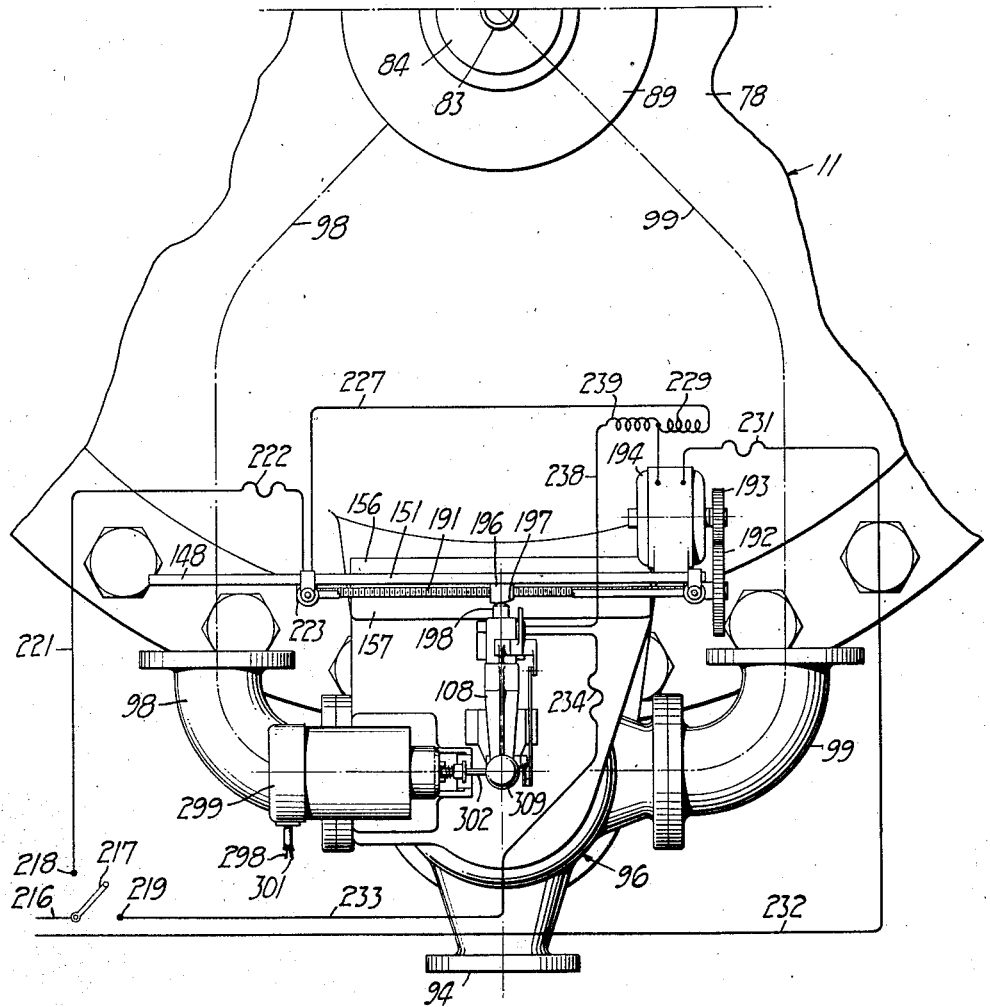
FIG_15_
INVENTORS
Ray S. Quick
BY   George A. Buehle
Marcus Lothrop
ATTORNEY.

Patented Oct. 31, 1939

2,178,123

UNITED STATES PATENT OFFICE 2,178,123

HYDRAULIC SYSTEM

Ray S. Quick, Burlingame, and George A. Buehle, San Francisco, Calif., assignors to The Pelton Water Wheel Company, San Francisco, Calif., a corporation of California Application October 30, 1935, Serial No. 47,480

15 Claims. (Cl. 137—139)

This invention relates to means for controlling flow in hydraulic conduits and is particularly concerned with controlling means for conduits in which the flow must be regulated precisely. In some hydraulic conduits the characteristics of the fluid flow are of no particular concern and any alteration of the flow is effected by relatively crude mechanism. In many hydraulic conduits, however, the characteristics of the flow (that is to say, its rate, its quantity, its rate of change, its head or pressure, and various other factors) are of considerable importance. The flow is regulated, usually, by some form of valve, and it is of great importance to guard against excessive pressure surges due to changes in position of the valve. It is also very desirable to be able to manipulate the valve precisely in order to control exactly the flow in the conduit. Furthermore, when the conduit includes other machinery, such as pumping mechanism for instance, the operation of the valve should be co-ordinated with the operation of the pump, so that under normal conditions the two will work in harmony and so that under abnormal conditions no deleterious effects or outright damage can occur.

Particularly where the hydraulic conduit includes a power-driven pump discharging through a controlling valve into a pipe line, certain special factors should be taken into account. That is, if the electrically driven pump is started and discharges through an open valve into an empty pipe line, the electric motor may be overloaded and seriously damaged. If the pump is started against a closed discharge valve and the valve is opened quickly into a full pipe line, a severe pressure surge may occur which may be quite destructive to the hydraulic mechanism. Similarly, if, when the pump is operating, the discharge valve is closed quickly, a severe pressure surge may be set up. Further, if the electric power should fail when the pump is pumping water through the line, the water in the discharge line tends to run backward through the pump, causing it to act as a turbine. The pump is usually so constructed that it runs faster as a turbine than as a pump, and overspeeding of the rotational equipment occurs, much to its detriment. Even so, the discharge valve must still be shut down in order to prevent exhaustion of the previously pumped water from the discharge system. If the discharge valve is closed without careful conrol, a severe surge is set up in the discharge line, which may damage the equipment and may even rupture the line.

It is therefore an object of the invention to provide a hydraulic conduit having a valve therein, in which the operation of the valve is governed automatically.

A further object of the invention is to provide means for controlling a valve in such a way that no deleterious surges occur in an associated hydraulic conduit and so that stresses arising out of operation of the valve will not exceed designed amounts.

An additional object of the invention is to provide a precisely operating valve, even of large size, which can readily be controlled by comparatively small forces.

A further object of the invention is to provide a valve for a hydraulic conduit which will cause relatively small head losses through the valve and which will occupy but a comparatively small space.

A still further object of the invention is to provide a discharge valve and a hydraulic conduit in connection with an electrically driven pump in such a way that no severe surges can occur due to the operation of the pump or of the discharge valve.

The foregoing and other objects are attained in the embodiment of the invention illustrated in the drawings, in which—

Fig. 1 is a diagram showing in side elevation a hydraulic system in accordance with the invention, particularly illustrating a valve in installed environment, together with diagrammatic representation of some of the controlling structure.

Fig. 2 is a diagram partially in cross-section through the median plane of a valve, with part of the hydraulic circuit and controlling instrumentalities.

Fig. 3 is a diagram showing the valve actuating and controlling mechanism.

Fig. 4 is a cross-section of a valve in accordance with the invention, the plane of section passing through the vertical axis of the valve.

Fig. 5 is a cross-section transversely of the valve on the line 5—5 of Fig. 4, showing part of the interior mechanism in end elevation.

Fig. 6 is a cross-section the planes of which are indicated by the lines 6—6 of Fig. 4.

Fig. 7 is an enlarged detail showing part of a position-responsive mechanism.

Fig. 8 is a cross-section of a modified form of valve in accordance with the invention, the plane of section passing through the vertical axis of the valve.

Fig. 9 is a partial cross-section of the upper part of the valve of Fig. 8, the plane of section being at right angles to the plane of section of Fig. 8.

Fig. 10 is a side elevation of the upper part of the valve of Fig. 8, showing a modified position-responsive mechanism.

Fig. 11 is partially diagrammatic and shows in end elevation part of the controlling mechanism.

Fig. 12 is a front elevation of the mechanism shown in Fig. 11.

Fig. 13 is a view similar to Fig. 12 but showing to an enlarged scale details of the position-responsive controlling mechanism.

Fig. 14 is a partial cross-section transversely through the mechanism of Fig. 13.

Fig. 15 is a plan view of the controlling mechanism as shown in Fig. 13, some of the electric circuit being shown diagrammatically.

In its preferred form, the hydraulic system of our invention includes a hydraulic conduit in which flow is established by a power-driven pump and in which a valve is situated to control the flow, there being provided a servo mechanism for moving the valve under control of various instrumentalities both manual and dependent upon various factors, such as conduit pressure, power failure, and the like.

While the hydraulic system which is the subject-matter of the present invention can be modified materially in accordance with the particular environment in which it is installed, and while it can be altered considerably in mode of operation to fit especial installation circumstances, there is described herein typical mechanism which illustrates the general characteristics and mode of operation of the hydraulic system.

A source of liquid 6 is connected by a relatively large, relatively long hydraulic conduit 7 to a terminal reservoir 8 which is at an elevation above the inlet reservoir 6. Interposed in the pipe line 7 is a pump 9 driven by a suitable source of power, such as an electric motor 10, for transferring the fluid from the reservoir 6 to the reservoir 8 through the pipe line. It is desirable that flow in the pipe line 7 be controlled with the utmost nicety in order to avoid stresses which are above those calculated in the design and in order that smooth functioning of the installation will be continued uninterruptedly. For this purpose a valve 11 is interposed in the pipe line adjacent the pump 9 but on the pump outlet pipe 12 or on the side of the pump away from the intake reservoir 6. The valve 11, as particularly shown in Figs. 4 and 5, incorporates a central casing 13 which is a body enclosing a central chamber 14 by means of walls 16 reinforced by integral ribs 17. Intersecting the casing 13 is a conical through-passage 18, the larger or discharge portion 19 of which is terminated by a fastening flange 21 intended to be secured to the hydraulic line pipe 22, while the smaller or inlet portion 23 is terminated by a fastening flange 24 for attachment to the outlet pipe 12 of the pump 9.

Adapted to co-operate with the passageway 18 and to operate within the chamber 14 is a valve body 27, in general occupying a large part of the space within the chamber 14 and in effect incorporating an upper portion 28 and a lower portion 29. The lower portion is a so-called "follower ring" which, when the body 27 is translated into its upper or open position, will be interposed between the portions 19 and 23. Since the body 27 is provided with a conical bore 30, it affords a substantial continuation of the portions 19 and 23 so that there is no material or significant interruption to hydraulic flow through the entire valve when the valve is in open position.

In the closed position of the valve, as illustrated in Fig. 4, the follower ring is disposed in the lower portion of the chamber 14 which is extended by a closure cap 31 bolted to the walls 16. The ring 29 is protected by a pair of guard plates 32 which are situated both in the casing 13 and in the cap 31 to lie in close juxtaposition with the follower ring and to prevent entrance of debris into the cap. A drain hole 33 in the cap, usually provided with a cock (not shown), permits flushing of the interior thereof whenever necessary. In the closed position of the valve the upper or gate portion 28 of the body 27 is disposed so that a pair of circular sealing rings 34 carried by the body are in close proximity to a similar pair of sealing rings 36 disposed within the casing 13. The pressure of water on the body 27 causes it to move sidewise slightly and to seat very tightly on whichever of the rings 36 happens to be on the low pressure side, so that no leakage through the valve occurs.

Since under normal operation it is desirable to operate the valve only when the inlet 23 and the outlet 19 contain water, there is preferably built into the casing 13 means for by-passing fluid around the valve body 27 even when it is in closed position. A by-pass inlet duct 37 extends from the inlet portion 23 exteriorly of the body 13 to a regulator 38, and from the regulator a by-pass outlet 39 extends back into the outlet portion 19. There is thus provided a path for fluid flow around the valve body 27 subject to the control of an instrumentality for that purpose. This mechanism (Fig. 2) preferably includes a valve chamber 41 having a valve seat 42 therein, against which a valve 43 can rest in closed position to preclude interflow between the duct 37 and the duct 39. The valve 43 is preferably moved by a piston 44 connected to the valve by a stem 46. A vent 47 permits the piston 44, and consequently the valve 43, to move freely in response to pressure existing within a chamber 48 which is connected by a duct 49 to a conduit 51. Thus the pressure conditions obtaining in the conduit 51 are effective to control flow through the by-pass from one side of the valve body 27 to the other.

Pressure conditions in the conduit 51 are made dependent upon pressure conditions adjacent the inlet portion 23 and the outlet portion 19. Thus, the pressure existing in the portion 23 is transmitted by a pipe 52 to an expansible chamber 53, one wall of which is movable, for instance being in the form of a piston 54. The piston 54 is on a stem 56 which also carries a valve 57, while a spring 58 urges the valve toward closed position. A conduit 59 around the stem 56 permits flow therethrough to a discharge pipe 61.

The fluid controlled by the valve 57 is derived preferably from the outlet 19 through a pipe 62 joined to the conduit 51 through a metering orifice 63 the area of which is less than the discharge area of the pipe 61, so that when the valve 57 is opened the pipe 61 can dispose of the fluid content of the conduit 51 and permit the piston 44 to move into such a position that the valve is unseated and by-pass flow of fluid takes place around the body 27. On the other hand, when the valve 57 is seated, due to absence of pressure in the inlet portion 23, the orifice 63 passes sufficient fluid from the pipe 22 so that the piston 44 seats the valve 43 and no flow takes place through the by-pass ducts 37 and 39.

For intermediate pressure conditions in the inlet portion 23, the pipe 52 transfers intermediate pressures to the piston 54 so that the valve 57 likewise occupies an intermediate position. If flow through the orifice 63 is exactly equalled by outflow past the valve 57 and through the pipe 61, the parts will remain in equilibrium; whereas if flow through the orifice 63 exceeds the possibility of discharge past the valve 57, the piston 44 will close the valve 43. On the other hand, if flow through the orifice 63 is less than can pass the valve 57, the valve 43 is opened to permit by-passing. Since the valve 57, which controls the discharge, is subject to the pressure in the inlet portion 23, and since the orifice 63 depends for the quantity it will pass upon the pressure within the discharge portion 19, the by-pass ducts 37 and 39 are affected by the relationship of the pressures within the portions 19 and 23, and these values can, by the design of the apparatus, be fixed at any amount desired. The by-passing mechanism therefore operates automatically in such a way that conditions on both sides of the body 27 are as nearly as possible maintained in a predetermined relationship.

In accordance with the invention a servo mechanism (that is, a mechanism which uses controlled auxiliary power for effecting the desired movements) is provided for moving the body 27. It is desirable to save as much space and as much machinery as possible, and consequently the body 27 itself is utilized as part of the servo mechanism. The interior of the body is preferably formed to provide a circular cylinder 70 which is lined with a suitable deterioration-resistant liner 71. The lower end of the cylinder 70 is closed by the bottom of the body 27 itself, whereas the upper end is sealed by a detachable cap 72 secured in place to form a fluid-tight enclosure. Disposed within the cylinder is a piston 73 mounted at the end of a piston tube 74 passing through a suitable stuffing gland 76 on the cap 72. The tube 74 traverses a chamber 77 defined by a closure hood 78 secured to the walls 16, and the tube 74 is anchored in the hood 78 by a removable fastening 79.

The piston 73 divides the cylinder 70 into an upper chamber 81 and a lower chamber 82, the relative volume of the chambers being proportional to and indicative of the position of the follower ring 29. That is, when the chamber 82 is of maximum volume, as shown in Fig. 4, the body 27 is in the position therein shown, the follower ring 29 is in its "lower" position, and the valve is closed. On the other hand, when the volume of the chamber 82 is a minimum and that of the chamber 81 is a maximum, then the follower ring 29 and the body 27 are in the "upper" position indicated by dotted lines in Fig. 4. The valve is then open, since the follower ring 29 is in registry with the portions 19 and 23. Intermediate volumes of the chambers 81 and 82 provide for corresponding intermediate positions of the valve.

A means is provided for varying the relative volume of chambers 81 and 82 in order to control the position of the valve, and this means preferably is designed to use a hydraulic fluid. This fluid may be derived from the pipe line 7, but in the present instance is derived from a separate and independent source and is preferably oil. Communication between the chamber 82 and the exterior of the valve is provided through a tube 83 which extends coaxially through the piston tube 74 and emerges from a fitting 84 at the top of the hood 78. Similarly, communication from the chamber 81 is by means of radial slots 86 into radial holes 87 in a sleeve 88 within the piston tube 74, the sleeve 88 terminating in the interior of a cup 89 access to which is had through a passage 91. Working fluid for the servo mechanism is derived from a reservoir 92 and is put under pressure by a suitably operated pump 93 discharging into a pressure line 94 and with which an accumulator 95 is connected to maintain a large body of oil under pressure. From the accumulator the oil pressure line 94 extends to a servo valve casing 96 wherein it intersects centrally a circular cylinder 97. Likewise intersecting the cylinder 97 is a pipe 98 from the passage 91 and a pipe 99 from the fitting 84. Additionally, a drain tube 101 and a drain tube 102 lead from the servo cylinder 97 back to the oil reservoir 92.

Adapted to operate within the cylinder 97 is a servo piston 103, including an upper land 104 and a lower land 106 separated by a spindle 107 which extends above the cylinder 97 and is guided in a stationary bracket 108. When the servo piston 103 is in an intermediate or neutral position, as shown in Fig. 2, the pipes 98 and 99 are blocked and no hydraulic flow occurs. When the piston 103 is lowered to "closing" position, the land 106 uncovers the pipe 99 to admit pressure liquid from the pressure line 94, and simultaneously the land 104 uncovers the pipe 98 for flow to the drain 101. The pressure fluid then flows through the line 94 into the pipe 99, through the inner tube 83, and into the lower chamber 82, while the upper chamber 81 simultaneously discharges through the tube 74 and the pipe 98 into the outlet or drain tube 101. The valve body 27 is thus moved downwardly toward its lower or closed position.

Conversely, when the servo piston 103 is lifted to "opening" position, the land 104 uncovers the pipe 98 to pressure from the line 94, and simultaneously the land 106 uncovers the pipe 99 to drain 102. Under this circumstance, pressure fluid enters through the lead 94, passes into the pipe 98 down through the outer tube 74 into the chamber 81, and tends to enlarge the upper chamber. Simultaneously, the chamber 82 contracts, discharging fluid through the central tube 83 and the pipe 99 into the in 102. The valve body 27 is consequently moved toward upper or open position.

In accordance with the invention, means is provided for automatically effecting suitable positions of the servo piston 103 in order to control the operation of the main valve. For this purpose there is provided a means responsive to the position of the valve body 27, located outside of the valve casing 13. Since the range of movement of the valve 27 is relatively large, but since a long range of movement is not necessary for the responsive mechanism, it is arranged that the movement of the responsive mechanism be proportional to the movement of the main valve.

One mechanism for this purpose is shown in Figs. 5, 6 and 7 especially, and includes the provision on the valve body 27 of an inclined plane 126 against which a cam follower 127 operates. The follower passes through a bushing 129 in the walls 16, and a packing 131 precludes material leakage. The follower 127 is connected by a link 132 to one arm 133 of a bell crank fastened on a shaft 134 journaled in a pedestal 135 secured to the walls 16. A pendant weight 136, connected to an arm 137 of the bell crank, tends to hold the follower 127 in close contact with the plane 126. Thus, as the valve body 27 rises and falls its relative position is followed by the shaft 134. This movement is transmitted by a lever 138 fastened on the shaft 134 and a link 139 pivoted thereto, to an arm 141 (Fig. 12) of a bell crank which is pivoted on a pin 142 carried by a bracket 143 conveniently clamped between flanges 144 on the pipe 98. The other arm 146 of the bell crank is connected by a link 147 to a rectilinearly translatable slide 148.

The slide 148 is conveniently disposed on the servo valve casing 96 and includes a plate 151 pierced by a longitudinal slot 152. Rollers 153 (Fig. 14) operate in the slot 152 and are carried on pins 154 engaging an upturned flange 156 on the casing 96 and likewise engaging a guide angle 157 on the body 96. The angle 157, together with the flange 156, forms a guide for the plate 151. The movement of the slide is directly in accordance with the movement of the main valve body 27, so that as the valve body rises from its closed position toward its open position, the slide 148 moves from left to right (Fig. 12), and, reversely, as the valve body lowers from its open position toward closed position, the slide 148 moves from right to left.

While the position of the slide 148 affords a visual indication of the proportionate position of the valve body 27, a direct visual indication is preferably provided by a rod 161 (Fig. 5) secured to the cap 72 and extending through the hood 78 to the exterior. A packing gland 162 precludes leakage, while a pointer 163 serves as a datum point.

In order that the valve casing need be pierced at but one point, to provide an emergency mechanical means for moving the valve body 27 and for other purposes, the construction illustrated in Figs. 8, 9 and 10 is adopted. In this arrangement the piston tube 74 is somewhat enlarged in diameter, as is the concentric tube 83. The tube 74 connects through the passage 91 with the pipe 98, while the tube 83 connects through the cup 89 and a passage 166 with the pipe 99. The hydraulic operation of the valve body 27 is the same as has been described. In the present modification, the body 27 is provided with a central boss 167 to which a central lifting rod 168 is attached. The rod 168 passes through a stuffing gland 169 in the cup 89 and terminates in a lifting ring 171.

If for any reason it is desired to move the valve body 27 without using the hydraulic mechanism provided for that purpose, the lifting ring 171 can be engaged by any suitable mechanism and, by reason of its connection through the rod 168 to the valve body 27, can effect movement of the valve body. Since the rod 168 partakes of the movement of the body 27 it is provided with a pointer 172 traversing a scale 173 mounted on the hood 78 to give a direct visual indication of the valve position.

The pointer 172 also serves to transmit the valve movement to a linkage for moving the slide 148. A cable 174 is fastened to the end of the pointer and extends around a large pulley 176 fastened on a shaft 177 journaled in brackets 178 and 179 on the hood 78. So that the range of movement to be transmitted will not be so great, a small pulley 181 is fastened to the shaft 177 and carries a cable 182. A pulley 183 journaled in a bracket 184 on the hood 78 turns the cable 182 which is then passed around a sheave 186 at the end of the plate 151 and is anchored to the bracket 184. To effect return movement of the slide 148 and to maintain the cables taut, a strong spring 187 is fastened to the plate 151 and to an arm 188 on the bracket 179. With this arrangement the slide 148 is moved to the right and to the left in accordance with the lifting and lowering movement of the valve body 27.

The movement of the slide 148 is utilized to limit the amount of opening of the valve body 27 by stopping the valve body in any selected location. To this end the plate 151 carries in suitable journals 189 a screw shaft 191 which at one end carries a gear 192 meshing with a gear 193 driven by a reversible electric motor 194 mounted on the plate 151. Power to the motor is carried through flexible conductors so that movement of the motor with the slide does not affect the supply of power. By suitable controls the operator can energize the motor 194 so that through the gears 192 and 193 the screw shaft 191 is rotated in either direction. This rotary movement of the screw shaft translates an opening limit wedge 196. This wedge is an internally threaded cam rectangular in transverse cross-section to translate without rotation on the plate 151, and is provided with an inclined face 197.

The slide 148 moves toward the right (in Figs. 12 and 13) as the valve 27 opens, until such time as the limit wedge 196 is moved against and translates a plunger 198 (Fig. 14) mounted for reciprocation in the bracket 188 on the servo valve casing 96. Movement of the plunger 198 is made effective through a coil spring 201 on a plunger rod 202 which abuts one lever 203 of a bell crank pivoted about a pin 204 on a bracket 206 secured to the casing 96. The bell crank likewise incorporates a counterweight 207 so that the lever 203 normally urges the rod 202 towards the left (Fig. 14) so that a stop collar 208 contacts with the bracket 188. A coil spring 209 normally urges the plunger 198 into the path of or into abutment with the opening limit wedge 196. Also incorporated with the bell crank is an arm 211 which at its terminus bears against a collar 212 on the servo piston spindle 107. If a superior force urges the spindle 107 upwardly so that the collar 212 rotates the bell crank about the pin 204 in a counter-clockwise direction, the rod 202 compresses the coil spring 201 which yields under this force. Normally, however, the opening limit wedge 196 is effective through the coil spring 201 to rotate the bell crank about the pin 204 so that the collar 212 is forced downwardly. The wedge 196 restores the servo piston 103 to neutral position, thereby stopping the valve body 27 in an intermediate location dependent upon the relative location of the wedge 196 on the slide 148. The wedge face 197 is of sufficient extent to move the spindle 107 from open position through neutral position into closing position, but when the wedge 196 is moved by the slide 148 alone it is ineffective to do more than move the spindle 107 to neutral position, since when the servo fluid is cut off the valve body 27 stops and, correspondingly, the slide 148 stops also.

Since the operator by controlling the motor 194 governs the position of the wedge 196 and consequently the open position of the valve, means is provided for precluding over-travel of the wedge. This is effected by controlling the electric circuits of the motor 194. A power supply conductor 216 (Fig. 15) extends to a knife switch 217 which can be moved from a central "off" position into abutment with a contact 218 or with a contact 219. From the contact 218 a conductor 221 extends through a flexible lead 222 to a switch 223 (Fig. 13) mounted on the slide 148. The switch is normally closed by a spring-pressed plunger 224 spanning contacts 226 at the end of the lead 221 and at the end of a conductor 227. But when the wedge 196 is in its fully open position near the end of the threads on the screw shaft 191, it displaces a finger 228 on the plunger 224 and opens the switch. The conductor 227 extends to the "valve open" field winding 229 of the motor 194 from whence a flexible lead 231 joins a conductor 232 back to the power source.

By closing the switch 217 on the contact 218 the operator energizes the winding 229 so that the motor 194 moves the wedge 196 to the left (Fig. 15). When the wedge arrives in a selected position, the operator opens the switch 217. But if the valve body 27 is to be fully opened, or in the event the operator inadvertently leaves the switch 217 closed on contact 218, the switch 223 is opened automatically by the wedge 196 and the motor 194 is de-energized.

From the contact 219 a conductor 233 extends through a flexible lead 234 to a switch 236 (Fig. 14) identical with the switch 223 and having a finger 237 moved by the plunger 198. The switch 236 is normally closed, but when the plunger is fully translated by the wedge 196, the switch 236 is opened. A conductor 238 extends from the switch 236 to the reverse field winding 239 of the motor 194 from whence the circuit is completed through the lead 231 and the conductor 232.

By closing the switch 217 on the contact 219 the operator energizes the winding 239 so that the motor 194 moves the wedge 196 toward the right (Fig. 15). This movement can be stopped in any position by opening the switch 217, but if the switch is left closed the wedge 196 continues its movement until it abuts and translates the plunger 198. This translation causes the finger 237 to open the switch 236, and the motor 194 is automatically de-energized.

In order that the valve body 27 will move precisely at the correct rate during its final closing movement, so as not to produce deleterious surges or stresses during movement through this critical range, there is provided on the slide 148 a closing limit cam mechanism. This mechanism includes a bar 241 (Figs. 13 and 14) which at its opposite ends is provided with yokes 242, the threaded stems 243 of which pass through threaded spools 244 provided with thumb knobs 246 and loosely journaled in brackets 247 secured to the plate 151. By suitably rotating the thumb knobs 246, the opposite ends of the closing bar 241 can be suitably adjusted, either by inclining the bar from the horizontal or by vertically moving the bar parallel to itself. The bar is provided with a lower cam face, having an initial closing portion 248, a transition closing portion 249, and a final closing portion 251, the transition portion 249 having any contour which is indicated by the conditions of installation of the valve.

When the servo piston 103 is depressed into closed position and the valve body 27 responds thereto by descending toward valve-closed position, the plate 151 carries the bar 241 toward the left (Fig. 13) until the transition portion 249 rides upon an arm 252 of a bell crank which is pivoted on a pin 253 on the bracket 108. The arm 252 is consequently depressed or rotated counter-clockwise (Fig. 14) so that another arm 254 of the bell crank is effective through a link 256 to rotate an arm 257 about a pivot axle 258. Mounted on the axle 258 is a pair of cams 259 which, being rotated, contact a collar 261 and lift the spindle 107. The contour of the cams 259 is effective through the full range of cam movement to lift the servo piston 103 from "closed" position almost but not quite up to "neutral" position. This movement takes place in accordance with the shape of the transition closing portion 249. As the valve body 27 returns more nearly to its closed position the contours of the transition cam 249 and the final closing portion 251 cause any desired graduation of closing movement by precisely controlling the servo piston 103. The cams 259 ensure an appropriate closing movement of the main valve body 27 but, since they restore the piston 103 not quite to neutral position, the valve body 27 is moved into and held in closed position under pressure.

In addition to the means for limiting the valve to a selected open position, and in addition to the means for governing exactly the final closing movement of the valve, there is preferably provided mechanism for establishing the normal rate of movement of the valve, so that the maximum speed of valve movement under all conditions cannot exceed a predetermined, adjusted rate. The spindle 107 of the servo piston 103 passes freely through a stop collar 266, formed as part of the bracket 108, and adjacent the collar 266 the spindle is threaded. Engaging the threads above the collar is a closing rate nut 267 and a locking or jam nut 268. When the spindle is depressed to move the piston 103 into closing position, the closing rate nut 267 abuts the stop collar 266 and prevents further lowering of the piston. The nut 267 can occupy such a position on the threaded stem that the lands 104 and 106 will uncover fully their respective ports. A maximum hydraulic flow can occur through the servo mechanism and the valve body 27 moves toward closed position at the maximum designed rate. If the nut 267 is adjusted to permit only partial uncovering of the associated ports by the lands 104 and 106, a throttling of the servo liquid occurs and the valve body 27 moves toward closed position at less than its maximum rate. Similarly, mounted on the spindle is an opening rate nut 269 and a jam nut 271 which limit the permissible rising movement of the spindle 107 and, depending upon their adjustment, either permit a full flow of servo liquid to open the valve body 27 at its maximum designed rate or stop the servo piston 103 in a position to throttle the opening flow of servo liquid to effect a rate of valve opening which is less than maximum.

Additional factors are made effective upon the servo piston 103 and preferably are arranged in such a way that the driving power for the pump 9 is included in the control. The electric motor 10 is preferably supplied with power by electric leads 281 and 282 (Fig. 1), the current being controlled by the two blades 283 and 284 of a master switch 285. A third blade 286 can be operated manually but is automatically opened in conjunction with the blades 283 and 284 by a hook bar 287. When the switch 285 is closed to energize the motor 10 to start the pump 9, current flows simultaneously from the lead 282 through a conductor 288 to a pressure-responsive switch 289. This switch is of any suitable type and is illustrated diagrammatically as responsive to the pressure in the pump discharge pipe 12, and when the pressure in the discharge pipe exceeds a predetermined amount, as established by a spring 291, a switch 292 bridges the gap in the circuit at this point and current flows to a second pressure-responsive switch 293 which is responsive to the pressure in the pipe 22 on the discharge side of the valve 11. When this pressure exceeds a predetermined minimum, as established by a spring 296, the circuit is completed and current flows to the blade 286 through a conductor 297. From the switch 286 a conductor 298 leads to a solenoid 299, and from thence a conductor 301 leads back to the main circuit, particularly to the conductor 281.

When the pressure on either side of the main valve 11 is not suitable and the switches 289 and 293 are not closed, or when the master switch 285 is opened, or when the blade 286 is individually opened, the solenoid 299 is de-energized. The solenoid 299 is preferably mounted on the casing 96, so that the solenoid core is effective upon a bell crank lever 302 pivoted on a pin 303 on the casing 96 and having an arm 304 bearing against the collar 212 on the servo piston spindle 107. Whenever the solenoid 299 is not energized, a multiple leaf spring 306 bears against a stub lever 307 to urge the bell crank lever to rotate about the pivot pin 303 in a clockwise direction, as seen in Fig. 12, so that the arm 304 urges the collar 212 in a downward direction, thus moving the servo spindle 107 and, correspondingly, the servo piston 103 downwardly into closed position.

The relationship of the various control instrumentalities is disclosed diagrammatically in Fig. 3 which shows the closing limit bar 241 and the opening limit wedge 196 partaking of a proportion of the movement of the main valve body 27, illustrated in a half-open position. The valve body 27 has been in fully open position, as indicated by the relative position of the wedge 196, but the solenoid 299 has been de-energized so that the spring 306 has rocked the bell crank lever 302 to depress the spindle 107 and move the servo piston 103 into its lowermost position as fixed by the closing rate nut 267 which abuts the stop collar 266. This movement of the spindle has compressed an opening spring 308, has lowered the collar 212 from the arm 211, and has lowered the collar 261 into abutment with the cams 259. As the valve body 27 approaches its fully closed position, the cam surface 249 restores the spindle nearly to central or neutral position against the urgency of the leaf spring 306. The servo piston 103 interrupts the flow of servo liquid and the system comes to rest with the valve 11 fully closed. The switch 285 for the pump motor 10 is preferably automatically opened as the valve closes.

The foregoing rapid closure of the valve is primarily for emergency use and especially in the event of power failure. By suitable manual operation of the switch blade 217 to move the opening limit wedge 196 toward closed position, it is possible manually to regulate the closure of the valve at any desired rate, but of course not in excess of the maximum rates fixed by the automatic mechanism.

The valve is subsequently opened either by manually lifting a knob 309 and the spindle 107 against the urgency of the spring 306, or by energizing the solenoid 299 which rocks the bell crank lever 302 to render the leaf spring 306 ineffective and thus giving effect to the spring 308 which then lifts the spindle 107. In either case, the spindle is lifted as far as the opening rate nut 269 will permit, and the servo piston 103 admits of servo fluid flow to lift the valve body 27. The valve moves toward open position at the adjusted rate until the opening limit wedge 196 rocks the arm 211 to depress the collar 212 and the spindle 107 to neutral position. Operation of the servo mechanism is therefore interrupted with the valve 11 open.

Manual supervision may likewise be extended over the valve opening movement by operating the switch blade manually to move the opening limit wedge toward valve-open position relatively slowly and at any desired opening rate less than the opening rate fixed by the automatic mechanism.

We claim:

1. A hydraulic system comprising a casing having an inlet and an outlet, a valve body movable within said casing and having one portion for establishing communication between said inlet and said outlet and another portion for blocking communication between said inlet and said outlet, a cylinder incorporated with said other portion of said valve body, a piston in said cylinder and secured to said casing, means exterior of said casing for supplying said cylinder with fluid, and means extending from the interior of said casing to the exterior thereof for controlling said supplying means.

2. A hydraulic system comprising a casing having an inlet and an outlet, a valve body movable within said casing and having one portion for establishing communication between said inlet and said outlet and another portion for blocking communication between said inlet and said outlet, a cylinder incorporated with said other portion of said valve body, a piston in said cylinder and secured to said casing, means for supplying said cylinder with fluid, and means responsive to the movement of said valve body for controlling said supplying means.

3. A hydraulic system comprising a valve casing subject interiorly to hydraulic pressure exerted by a contained liquid, a valve body including a ring portion and a gate portion entirely contained and movable within said casing to control hydraulic flow through said casing, means isolated from said hydraulic pressure moving in accordance with the movement of said valve body, and means responsive to said moving means and at least in part immersed in said liquid within said casing for moving said valve body.

4. A hydraulic system comprising a casing adapted to contain liquid and having an inlet and an outlet coaxially disposed, a body within said casing having a gate portion and a ring portion adapted alternately to be disposed coaxially with said inlet and said outlet, means immersed in the liquid within said casing for moving said body selectively to dispose said gate portion and said ring portion coaxially with said inlet and said outlet, and means outside said casing and responsive to the movement of said body for controlling the operation of said moving means.

5. A hydraulic system comprising a casing adapted to contain liquid and having an inlet and an outlet coaxially disposed, a body within said casing movable at right angles to said axis to control communication between said inlet and said outlet, means immersed in the liquid within said casing for moving said body at right angles to said axis, and means outside said casing and responsive to the movement of said body for controlling the operation of said moving means.

6. A hydraulic system comprising a casing the interior of which is subject to hydraulic pressure and having an inlet and an outlet, a body within said casing having a gate portion and a ring portion selectively disposable between said inlet and said outlet, a cylinder within said body, a piston within said cylinder, a hollow piston rod connecting said piston and said casing, and means for circulating liquid from outside said casing through said piston rod and into said cylinder.

7. A hydraulic system comprising a casing having an inlet and an outlet, a body within said casing having a gate portion and a ring portion selectively disposable between said inlet and said outlet, a cylinder within said gate portion, a piston within said cylinder, a piston rod connecting said piston and said casing, and means outside said casing for supplying said cylinder with operating fluid.

8. A hydraulic system comprising a casing having an inlet and an outlet, a body within said casing having a gate portion and a ring portion selectively disposable between said inlet and said outlet, a cylinder within said gate portion, a piston within said cylinder, a piston rod connected to said piston and to said casing, and means including passages through said piston rod for conducting fluid to said cylinder on opposite sides of said piston.

9. A hydraulic system comprising a casing the interior of which is subject to hydraulic pressure and having an inlet and an outlet, a body within said casing and having a gate portion adapted to be interposed between and withdrawn from between said inlet and said outlet, a cylinder within said body, a piston within said cylinder, a piston rod connecting said casing and said piston, and means including passages in said piston rod for conducting fluid to said cylinder on opposite sides of said piston.

10. A hydraulic system comprising a casing having a fluid passage therethrough, a hollow body movable transversely into and out of said passage to control flow through said passage, a stationary piston dividing the interior of the body into two chambers, means for circulating fluid under pressure to and from the chambers to cause movement of the body, said means including a piston tube carrying the piston and a concentric tube within the piston tube dividing the piston tube opening into two passages, one passage communicating with one chamber and the other passage communicating with the other chamber, a lifting rod connected to the body and extending longitudinally through the concentric tube, a servo piston for controlling the flow through the passages, and an operative connection between the lifting rod and the servo piston.

11. A hydraulic system comprising a casing having a fluid passage therethrough, a hollow body movable transversely into and out of the passage to control flow therethrough, a stationary piston dividing the interior of the body into two chambers, means for passing fluid under pressure into one chamber while discharging it from the other chamber to cause operation of the body, a servo piston remote from the body for controlling said passing means, means for manually operating said servo piston, and an independent operative connection between said servo piston and said body whereby said servo piston is moved into closing position upon predetermined operation of said body.

12. A hydraulic system comprising a casing having a fluid passage therethrough, a hollow body movable transversely into and out of the passage to control flow therethrough, a stationary piston dividing the interior of the body into two chambers, means for passing fluid under pressure into one chamber while discharging it from the other chamber to cause operation of the body, a servo piston for controlling said passing means, means for manually operating said servo piston, and an independent connection between said servo piston and said body whereby said servo piston is moved into closing position upon predetermined operation of said body.

13. A hydraulic system comprising a hydraulic conduit, projections extending from opposite sides of said conduit to form a transverse casing the interior of which is subject to hydraulic pressure, a gate portion within said casing and movable transversely of said conduit into and out of one of said projections, a ring portion within said casing and movable transversely of said conduit into and out of the other of said projections, said gate portion and said ring portion being comprised in a valve body, a hydraulic cylinder within said valve body, a piston within said cylinder, a piston rod connected to said piston and to said casing, means including passages in said piston rod for conducting liquid to and from said cylinder on both sides of said piston, and means outside said casing and moving in accordance with the movement of said valve body for controlling said conducting means.

14. A hydraulic system comprising a casing adapted to contain liquid and having an inlet and an outlet, a valve body movable within said casing for alternatively positioning a ring to establish communication between said inlet and said outlet or positioning a gate to block communication between said inlet and said outlet, means positioned to be immersed in said liquid within said casing for effecting movement of said valve body, and means exterior of said casing sensitive to movement of said valve body for controlling said effecting means.

15. A hydraulic system comprising a main valve adapted to move between an open position and a closed position, a servo mechanism for moving said main valve, means including a piston valve for controlling said servo mechanism, a member moving in accordance with the movement of said main valve, and a lost motion connection between said member and said controlling piston valve permitting motion of one without exerting force upon the other.

RAY S. QUICK.
GEORGE A. BUEHLE.